(12) United States Patent
Denk et al.

(10) Patent No.: US 6,997,240 B2
(45) Date of Patent: Feb. 14, 2006

(54) FLAP FOR AN AIR-GUIDE DUCT

(75) Inventors: Walter Denk, Ditzingen (DE); Karl Lochmahr, Vaihingen (DE); Eric Reinisch, Weinheim (DE); Klaus Waibel, Kornwestheim (DE)

(73) Assignee: BEHR GmbH & Co., Stuttgart (DE)

( * ) Notice: Subject to any disclaimer, the term of this patent is extended or adjusted under 35 U.S.C. 154(b) by 340 days.

(21) Appl. No.: 09/859,891

(22) Filed: May 18, 2001

(65) Prior Publication Data
US 2002/0004368 A1 Jan. 10, 2002

(30) Foreign Application Priority Data
May 18, 2000 (DE) ................. 100 24 691

(51) Int. Cl.
B60H 3/00 (2006.01)
F16K 1/22 (2006.01)
(52) U.S. Cl. ............ 165/42; 454/69; 454/333; 251/305; 251/308
(58) Field of Classification Search ............ 165/42; 454/69, 333, 254; 251/305, 308, 306, 129.11
See application file for complete search history.

(56) References Cited

U.S. PATENT DOCUMENTS

| | | | | |
|---|---|---|---|---|
| 1,230,882 A | * | 6/1917 | Filbey | |
| 1,443,000 A | * | 1/1923 | Briggs | |
| 3,191,241 A | * | 6/1965 | Johnson | 454/335 |
| 3,312,242 A | * | 4/1967 | Kahn et al. | 251/308 |
| 4,225,114 A | * | 9/1980 | Barthelemy et al. | 251/308 |
| 4,313,592 A | * | 2/1982 | Baas | 251/305 |
| 4,325,536 A | * | 4/1982 | Garrett | 251/308 |
| 4,503,755 A | * | 3/1985 | Nordquist et al. | 251/308 X |
| 4,513,771 A | * | 4/1985 | Thomas et al. | 251/308 X |
| 4,534,538 A | * | 8/1985 | Buckley et al. | 251/306 |
| 5,160,115 A | | 11/1992 | Ito et al. | 251/129.12 |
| 5,370,361 A | * | 12/1994 | Mendell et al. | 251/308 X |
| 5,374,032 A | * | 12/1994 | Pearson et al. | 251/308 X |
| 5,878,806 A | | 3/1999 | Denk et al. | 165/42 |
| 6,296,564 B1 | * | 10/2001 | Arold et al. | 454/156 |
| 6,412,752 B1 | * | 7/2002 | Daly et al. | 251/129.11 |

FOREIGN PATENT DOCUMENTS

| | | |
|---|---|---|
| DE | 196 20 749 | 11/1997 |
| DE | 100 04 795 | 5/2001 |
| EP | 594 261 | 4/1994 |
| FR | 2 741 689 | 5/1997 |

\* cited by examiner

Primary Examiner—Ljiljana Ciric
(74) Attorney, Agent, or Firm—Foley & Lardner LLP

(57) ABSTRACT

A flap provided with an integral motor-containing drive element provided with an integral motor-containing drive element for controlling the air flow through an air-guide duct in, for example, a motor vehicle air condition system which includes a housing defining an air flow duct, an evaporator located in the housing, a heater located in the housing. The flap is adapted to be pivoted about and axis and is supported at each of its axial ends. One end is provided with a cut-out or recess which extends inwardly from one end along the axis of rotation. This cut-out or recess has opposed edges which engage in slots formed in holding means or housing that encloses the drive element, and which permit the ready insertion of the drive unit into an operative position.

12 Claims, 4 Drawing Sheets

FLAP FOR AN AIR-GUIDE DUCT

BACKGROUND OF THE INVENTION

The invention generally relates to a flap for controlling the mass flow through an air-guide duct, and more specifically to a heating or air-conditioning system in a motor vehicle, wherein the flap is mounted so that it can rotate about an axis and is provided with a drive element arranged inside it for inducing the pivoting movement.

A flap of this type is known from DE 196 20 749 A1. The flap which is disclosed in this Offenlengungsschrift has at least one axially arranged receiving pocket or housing which is formed in a minor edge of the flap. This receiving pocket or housing takes the form of a hollow cylindrical stub which is formed integrally with the flap proper. A drive or motor is received in this hollow stub, and has a switch which is connected to the associated housing or frame wall on which the flap is pivotably mounted.

U.S. Pat. No. 5,160,115 discloses an air-control flap which is mounted by way of a hollow shaft which is used to accommodate an electric motor. However, both of these arrangements suffer from the drawback that they are relatively complex and in each case require the drive to be installed in cavities which are formed in the flaps.

SUMMARY OF THE INVENTION

One object of the invention is directed to providing a flap, generally of the type described above, which is constructed and arranged so that the disposition/connection of the drive to the flap proper is highly simplified.

A further object of the invention resides in providing an improved air flow control device for controlling air flowing in a motor vehicle air-conditioning system.

Still another object of the invention is to provide an improved motor vehicle air-conditioning system embodying the improved air flow control device of the invention.

In accomplishing the foregoing objects, there has been provided according to one aspect of the present invention a device for controlling the air flow through an air-guide duct, comprising: a flap having a pivot axis about which it can rotate, the flap comprising at one axial end a recess defined by edges which run parallel to one another and to the pivot axis of the flap; and a drive element for pivoting the flap, the drive element including an outer casing having grooves extending along opposing sides, wherein the edges of the recess engage in the grooves and serve as guide and attachment edges for installation of the drive element.

In accordance with an aspect of the invention, there has been provided an outer casing which comprises a holding member including a sleeve which accommodates the drive element.

In accordance with yet another aspect of the invention, there has been provided an outer casing which serves as the housing of the drive element.

In accordance with another aspect of the invention, there has been provided a motor vehicle air-conditioning system, comprising a housing defining an air flow duct, an evaporator located in the housing, a heater located in the housing and an air flow control device positioned in the air flow duct, wherein the air flow control device comprises a device as described.

According to still another aspect of the invention there is provided an air flow control device for controlling air flowing in a motor vehicle air-conditioning system, comprising: a mounting frame adapted for installation in a duct of a motor vehicle air-conditioning system; and a plurality of flaps mounted pivotably at their ends in the lateral sides of the frame, the flaps having dimensions selected such that, in a closed position, they close the through-passage cross section of the frame, wherein at least one of the flaps comprises a device as described above.

Further objects, features and advantages of the invention will become more clearly appreciated as an explanation of an exemplary embodiment is given with reference the appended drawings.

DETAILED DESCRIPTION OF THE PREFERRED EMBODIMENTS

Figure 1:
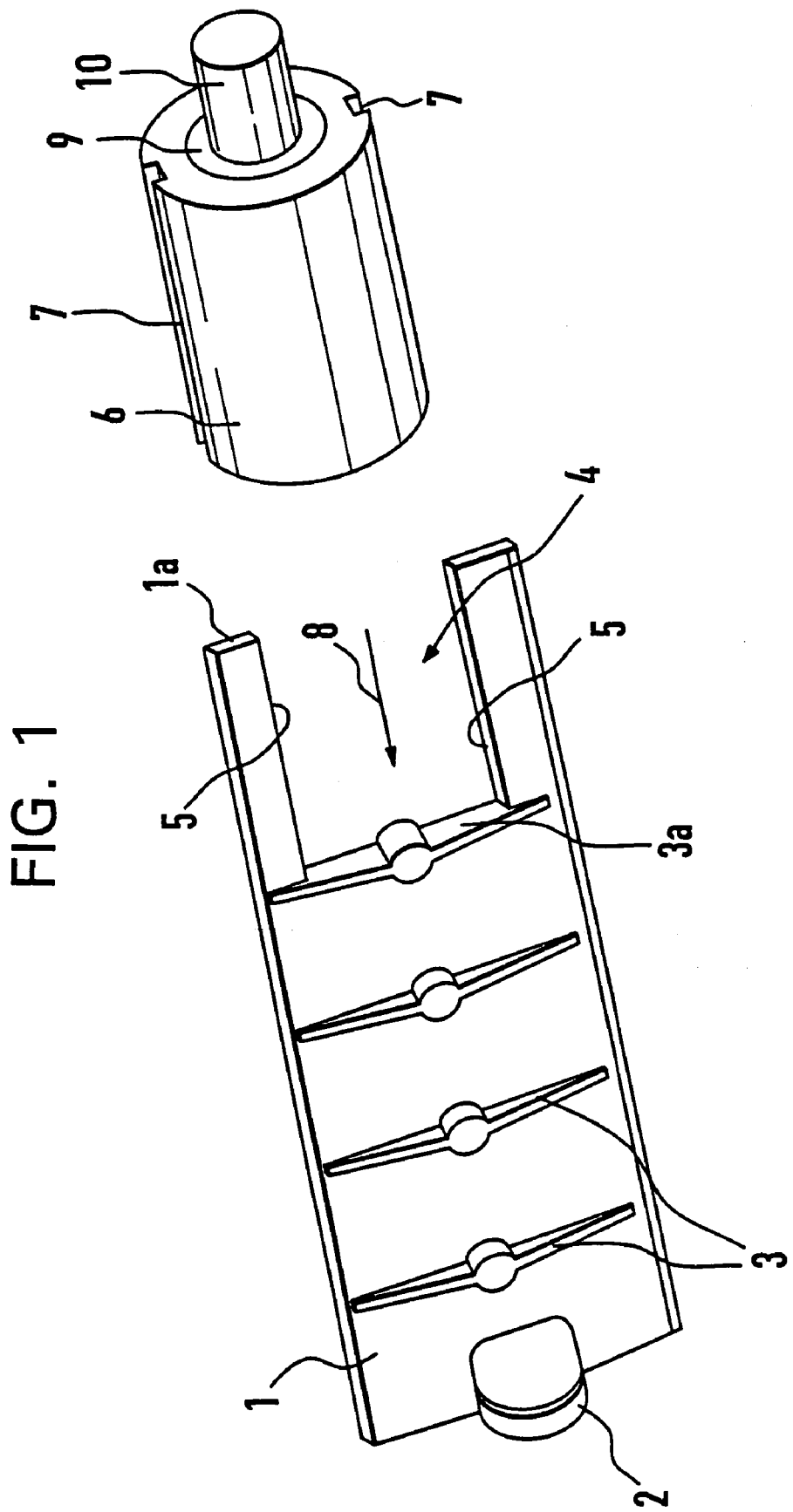
FIG. 1 is a perspective exploded view showing an embodiment of the invention.

According to the invention, a pivotal flap is provided with a cut-out or recess which extends inwardly from one end of the flap and along an axis about which the flap is pivoted. These edges serve as guide and attachment surfaces which engage in diametrically opposed grooves formed in the external surface of a housing for a drive element/motor.

This configuration makes it easy to pre-assemble a motor in a slotted housing and then push the completed drive unit into the recess. The novel flap arrangement therefore results in a substantially simplified structure and improved ease of assembly.

In one embodiment of the invention, the holding means or housing may comprise a sleeve which accommodates the drive element. However, it is also possible for the housing of the drive element itself to be designed as the holding means and to be provided with the opposed set of grooves.

To axially secure the housing/holding means, latching elements may be provided on the holding means and/or on the recess, so that there is no need for a special attachment operation after the holding means has been pushed into the recess.

A first aspect of the invention resides in a device for controlling the mass flow through an air-guide duct, in particular for a heating or air-conditioning system in a motor vehicle, which comprises: a flap mounted so that it can rotate about an axis of rotation, the flap being provided with a drive element for providing the pivoting drive, wherein the flap, starting from one of its end sides, is provided with a recess with edges which run parallel to one another and to the longitudinal edges of the flap and which serve as guide and attachment edges for opposite grooves on a holding member of the drive element.

A second aspect of the invention resides in a device comprising: a flap which is pivotal about an axis of rotation, the flap having a cut-out portion at one axial end; a drive element for pivoting the flap; and a drive element housing which encloses the drive element and which is formed with grooves which engage edges of the cutout out portion.

The flap 1 is provided with a known type of bearing journal 2 at one end thereof for enabling its mounting to a wall of support member of a duct through the fluid flow is to be controlled.

This side wall or support member may be part of an installation frame in which the flap is arranged either along or with one or more other similar flap arrangements, e.g., to form a louver. One example of such an arrangement in an automotive air-conditioning system is described in U.S. Pat. No. 5,878,806, the disclosure of which is hereby incorporated by reference.

The flap proper 1 is made from plastic or a suitable light material (such as light alloy, carbon fiber composite, or the like), having sufficient structural rigidity/strength for the intended control purpose. In this embodiment, the flap is provided with a plurality of reinforcement ribs 3 which run transversely with respect to an axis about with the flap is pivotal. As shown, these ribs 3 are distributed uniformly over a central portion of the flap.

A rectangular recess or cut-out 4 is provided in the flap 1. As illustrated, this recess 4 extends from one end of the flap to a portion proximate a reinforcing rib 3a which is furthest from the bearing journal 2. This recess 4 has edges 5 which lie opposite one another and, in this embodiment, run parallel to one another. These edges 5 serve as guides for a cylindrical sleeve 6 which is provided with diametrically opposed grooves 7. The spacing between the edges 5 and the dimensions of the recess 4 is selected with respect to the diameter of the sleeve 6 and the depth of the grooves 7 in order to achieve a snug fit and enable the sleeve 6 to be received in a positively locking manner when pushed into the recess 4 in the direction indicated by arrow 8.

A drive element or unit 9, which is not shown in detail, is disposed within the sleeve so as to prevent relative rotation with respect thereto. The output shaft 10 of this drive element 9 projects out of the sleeve 6, serves, like the bearing journal 2, to pivotably mount the other end of the flap 1 in a rotationally fixed manner in the associated bearing wall—in particular the above mentioned installation frame.

Figure 2:
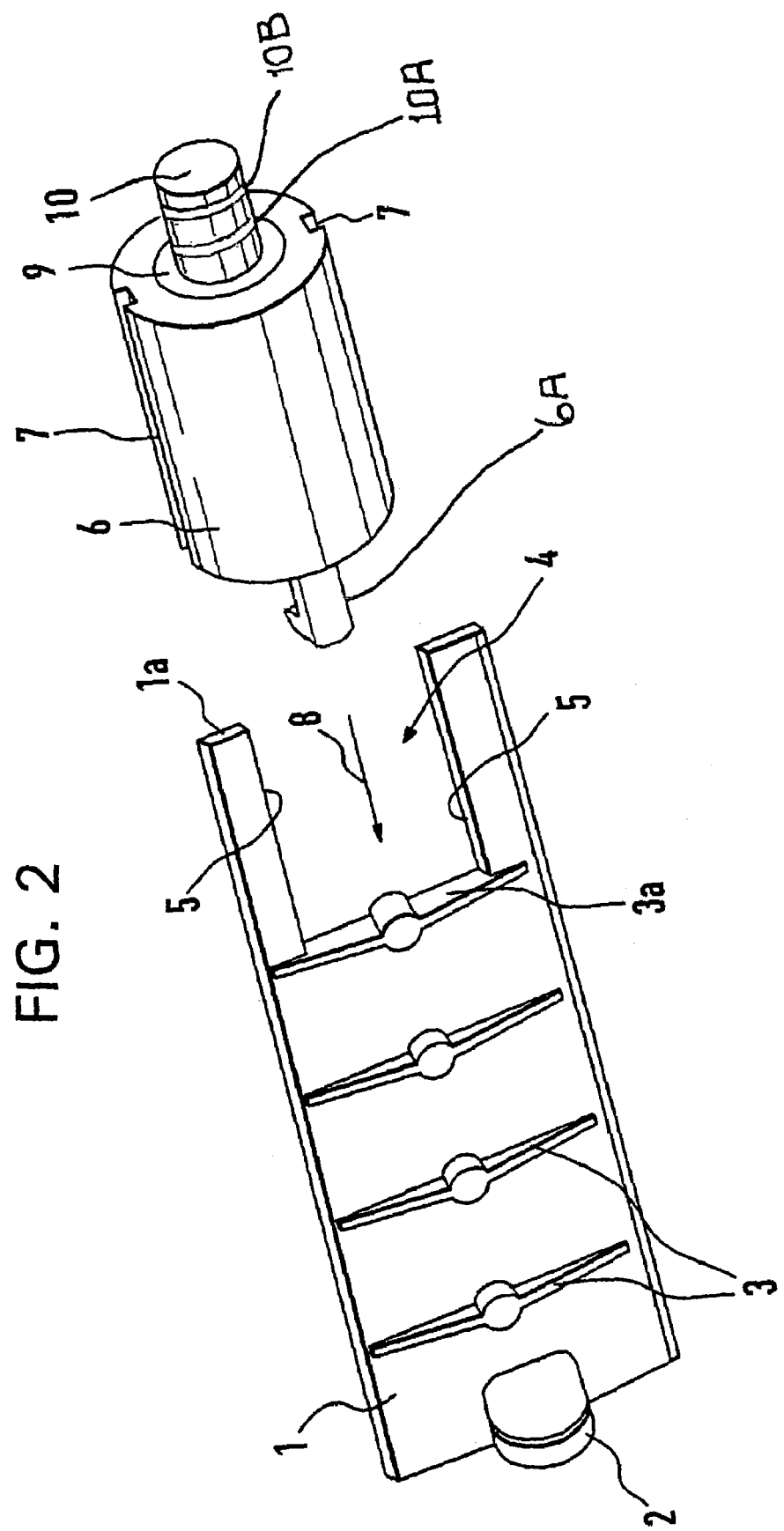
FIG. 2 is a perspective exploded view showing the embodiment of FIG. 1 wherein the rotary drive unit is provided with latching pawls and connection electrodes.
Figure 3:
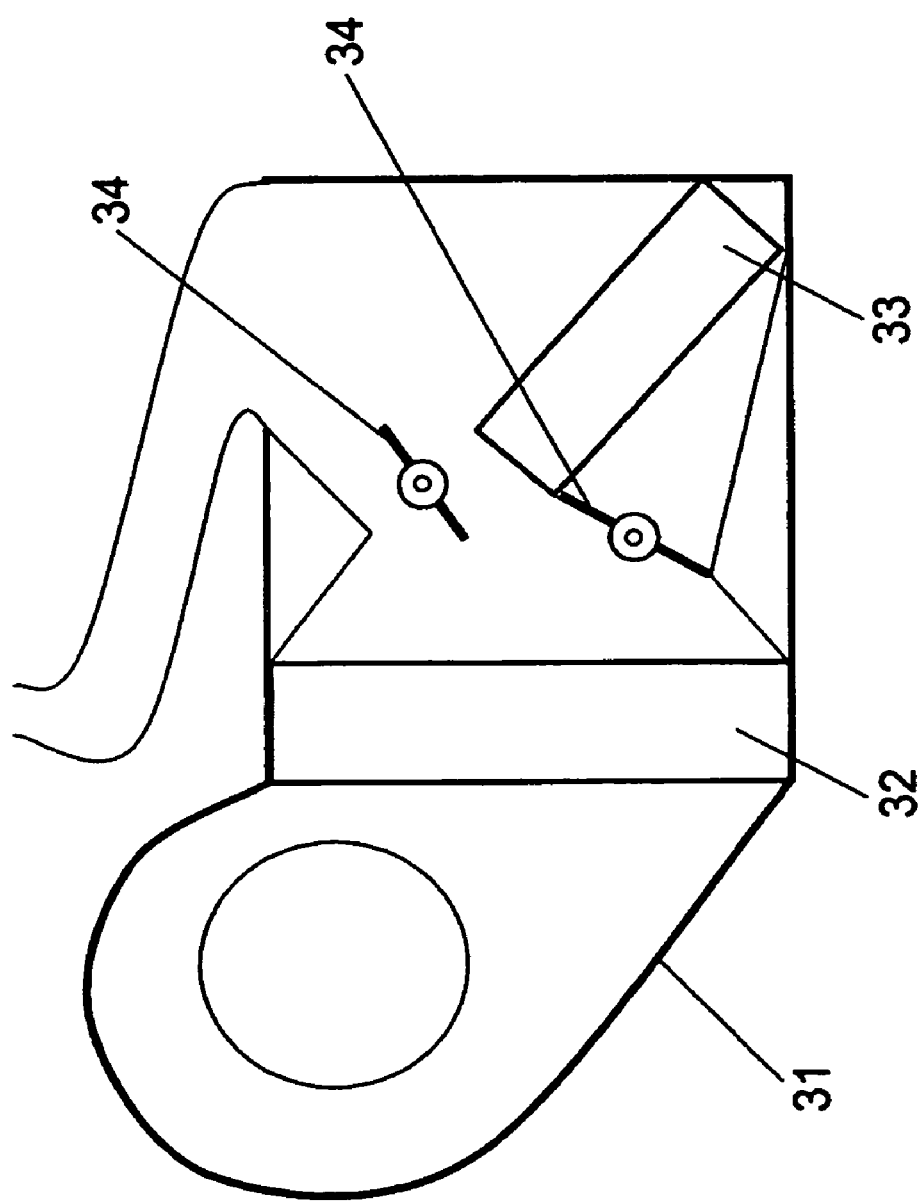
FIG. 3 shows a motor vehicle air conditioning system comprising a housing 31 defining an air flow duct, an evaporator 32 located in the housing, a heater 33 located in the housing, and an air flow control device 34 positioned in the air flow duct.
Figure 4:
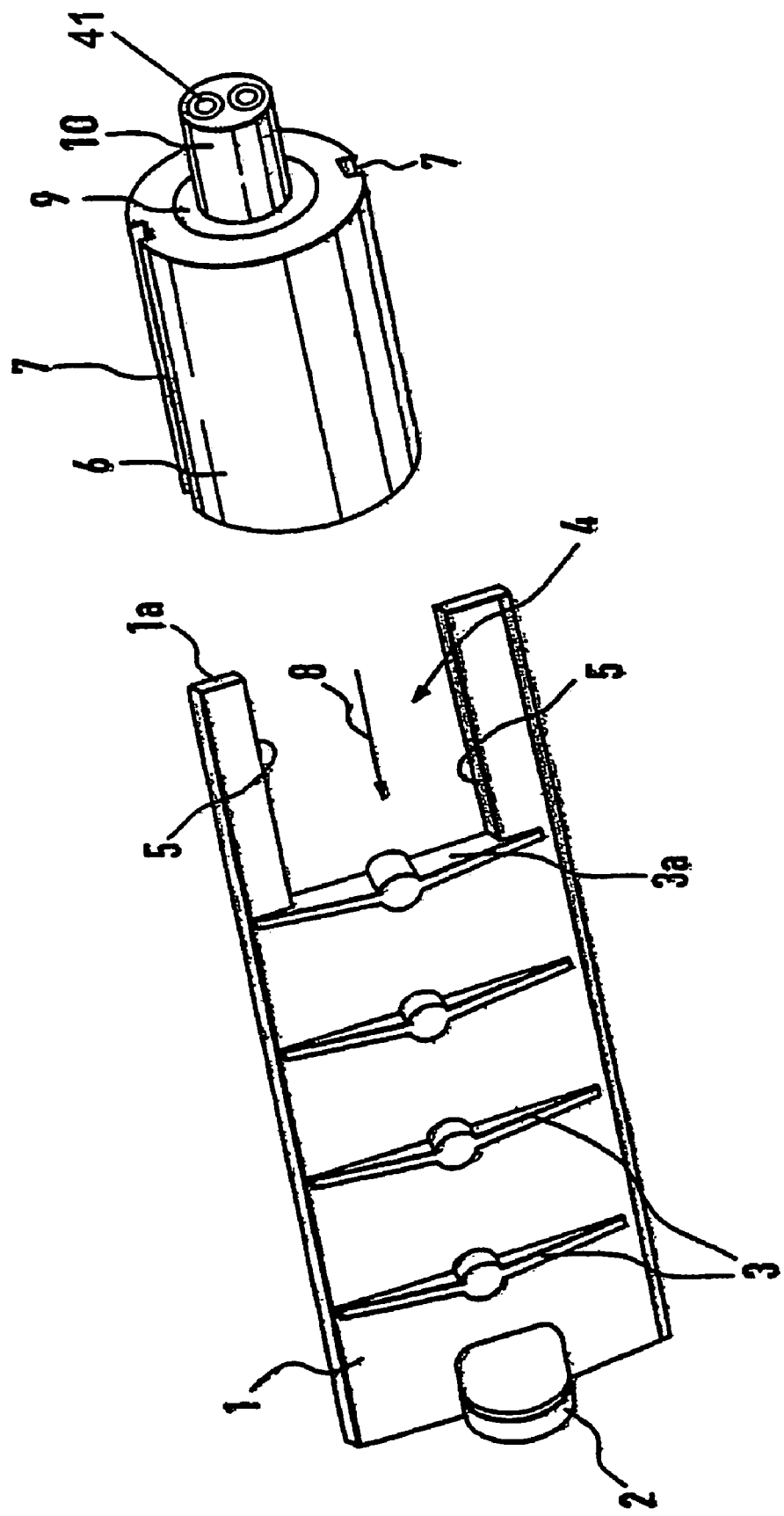
FIG. 4 is a perspective exploded view showing the embodiment of FIG. 1 wherein the drive element is provided with connection 41 for supplying fluid pressure.

The energy/power for the drive element 9 may be supplied via the shaft 10 which can be provided suitable electrodes, such as the annular bands 10A and 10B illustrated in FIG. 2, or other suitable connections/ports which permit fluid pressure (e.g. vacuum, air pressure, hydraulic pressure) or the like, to be alternatively supplied.

This configuration makes it possible to easily provide a control flap with a drive, it then being possible for this driven flap to be connected to other pivotable flaps, for example by means of a coupling rod or rods, so that the additional flaps do not themselves have to be driven per se. Of course, it is also possible, and in some cases expedient, in an arrangement of a plurality of pivoting flaps, in particular in an installation frame, for each of the flaps to be provided with its own drive, in order to achieve a highly variable and sensitive control of the air flow.

In the case of undriven flaps, it is possible for an insert or filling piece to be pushed into the recess 4 in place of the sleeve 6, so as to fill the open space generated by the recess 4, thus allowing the entire area of the flap to be used for control purposes.

Further, it is not necessary to insert a drive element 9 into a sleeve 6 which serves as a holding means. That is to say, the housing of the drive element 9 per se, can be directly provided with the grooves 7 and for the recess 4 can be adapted to the dimensions of the housing of the drive element 9.

In the region of the recess 4, for example, at its end wall adjacent to the reinforcing rib 3a, latching elements such as connection pawls 6A can be provided which interact with corresponding latching sites and/or rib 3a on the sleeve 6, so that when the sleeve has been pushed as far as the end stop in the direction indicated by arrow 8. This eliminates the need for the sleeve 6 to be secured against axial displacement with respect to the flap 1 in separate assembly operation.

Naturally, it may even be sufficient for the friction, which is generated between the edges 5 and the grooves 7, to be sufficient to hold two elements together, especially in light of the fact that the flap 1 is, in any case, mounted by means of its bearing journal 2 and the shaft 10 between side walls of a frame or of the air-guide duct.

The disclosure of German Patent Application No. 100 24 691.5, filed May 18, 2000, is hereby incorporated by reference in its entirety. Also incorporated by reference is the disclosure of the copending U.S. application filed concurrently herewith bearing Ser. No. 09/859,892.

The foregoing embodiments have been shown and described for illustrative purposes only and are not intended to limit the scope of the invention which is defined by the claims. The invention includes all obvious modifications of the embodiments described above.

What is claimed is:

1. A motor vehicle air-conditioning system, comprising a housing defining an air flow duct, an evaporator located in the housing, a heater located in the housing and an air flow control device positioned in the air flow duct, wherein the air flow control device comprises a flap having a pivot axis about which said flap can rotate, said flap comprising at one axial end a recess defined by edges which run parallel to one another and to the pivot axis of the flap; and a motor-containing drive element for pivoting the flap arranged within the recess, said motor-containing drive element including a mounting member having grooves extending along opposing sides, wherein the edges of said recess engage in said grooves and serve as guide and attachment edges for installation of the motor-containing drive element.

2. A motor vehicle air-conditioning system as claimed in claim 1, wherein the mounting member comprises an outer casing including a sleeve which accommodates the motor-containing drive element.

3. A motor vehicle air-conditioning system as claimed in claim 2, wherein the outer casing serves as the housing of the motor.

4. A motor vehicle air-conditioning system according to claim 2, wherein the spacing between the edges and the dimensions of said recess are selected with respect to the diameter of the sleeve and the depth of the grooves to enable the sleeve to be received in a positively locking manner when inserted into the recess.

5. A motor vehicle air-conditioning system as claimed in claim 1, further comprising a latching element, attached to one of the mounting member and the flap, for axially securing the motor-containing drive element in said recess.

6. A motor vehicle air-conditioning system according to claim 1, wherein the motor-containing drive element is provided with a shaft.

7. A motor vehicle air-conditioning system according to claim 6, wherein the shaft comprises electrodes for supplying power to the motor-containing drive element.

8. A motor vehicle air-conditioning system according to claim 6, wherein the shaft comprises connections or ports for supplying fluid pressure to the motor-containing drive element.

9. A motor vehicle air-conditioning system according to claim 1, wherein the flap comprises plastic, an alloy or a carbon fiber composite.

10. A motor vehicle air-conditioning system according to claim 1, wherein the flap comprises at least one reinforcing rib.

11. A motor vehicle air-conditioning system according to claim 10, wherein the at least one reinforcing rib runs transversely with respect to the axis about which the flap is pivotal.

12. A motor vehicle air-conditioning system according to claim 10, wherein the flap comprises a plurality of reinforcing ribs distributed uniformly over a central portion of the flap.

* * * * *